(12) United States Patent
Hattori et al.

(10) Patent No.: US 8,599,396 B2
(45) Date of Patent: Dec. 3, 2013

(54) IMAGE FORMING APPARATUS

(75) Inventors: Mitsuharu Hattori, Nagoya (JP); Shota Iijima, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/398,409

(22) Filed: Feb. 16, 2012

(65) Prior Publication Data

US 2012/0147408 A1    Jun. 14, 2012

Related U.S. Application Data

(63) Continuation of application No. 13/333,163, filed on Dec. 21, 2011, now Pat. No. 8,379,264, which is a continuation of application No. 12/411,635, filed on Mar. 26, 2009, now Pat. No. 8,085,432, which is a continuation of application No. 11/071,807, filed on Mar. 4, 2005, now Pat. No. 7,538,906.

(30) Foreign Application Priority Data

Mar. 5, 2004 (JP) ................................. 2004-063213

(51) Int. Cl.
  *H04N 1/46*    (2006.01)
  *G06F 3/12*    (2006.01)

(52) U.S. Cl.
  USPC ........................... 358/1.13; 358/501; 358/502

(58) Field of Classification Search
  USPC ................. 358/500, 400, 501, 502, 503, 296; 271/145, 121; 347/3, 8, 19, 30
  See application file for complete search history.

(56) References Cited

U.S. PATENT DOCUMENTS

| 5,844,687 | A | 12/1998 | Nagane et al. |
| 5,909,226 | A * | 6/1999 | Takeda ............................... 347/3 |
| 5,988,784 | A * | 11/1999 | Takemura et al. ................. 347/8 |
| 6,188,417 | B1 | 2/2001 | Keefe et al. |
| 7,413,186 | B2 * | 8/2008 | Koga et al. ..................... 271/145 |
| 7,605,956 | B2 * | 10/2009 | Lee ................................. 358/498 |
| 7,688,485 | B2 * | 3/2010 | Chen et al. ..................... 358/502 |
| 2002/0067513 | A1 * | 6/2002 | Sasai et al. ..................... 358/400 |

(Continued)

FOREIGN PATENT DOCUMENTS

| JP | 08-186678 | 7/1996 |
| JP | 10-157155 | 6/1998 |
| JP | 2004-025856 | 1/2004 |

OTHER PUBLICATIONS

Japanese Office Action dated Sep. 8, 2009 in JP Application No. 2004-063213.

*Primary Examiner* — Jerome Grant, II
(74) *Attorney, Agent, or Firm* — Banner & Witcoff, Ltd.

(57) ABSTRACT

An image forming apparatus includes: a reading mechanism having an original placement portion on which an original document is placed for reading an image; a recording mechanism having a medium supply tray on which a recording medium is set, the recording mechanism being disposed in such a manner that a longitudinal direction of the medium supply tray is substantially perpendicular to a longitudinal direction of the original placement portion; an angular casing that houses the reading mechanism and the recording mechanism while stacking the reading mechanism and the recording mechanism vertically; and a cartridge holder that houses an ink cartridge and is disposed in a space located at a corner position of the casing below the reading mechanism and surrounded by a circumferential wall of the casing and a side wall of the medium supply tray.

20 Claims, 10 Drawing Sheets

(56) References Cited

U.S. PATENT DOCUMENTS

| | | |
|---|---|---|
| 2003/0149760 A1* | 8/2003 | Maeda ........................ 709/223 |
| 2003/0206224 A1 | 11/2003 | Sakakibara et al. |
| 2004/0020672 A1* | 2/2004 | Lessard ...................... 174/35 R |
| 2004/0196484 A1* | 10/2004 | Masumoto et al. .......... 358/1.13 |
| 2004/0212655 A1* | 10/2004 | Sasa .............................. 347/30 |
| 2004/0246290 A1* | 12/2004 | Hayashi et al. ................. 347/19 |
| 2005/0140083 A1* | 6/2005 | Koga et al. ................... 271/121 |
| 2005/0150400 A1* | 7/2005 | Lin ................................ 101/35 |
| 2005/0232653 A1 | 10/2005 | Murooka |
| 2006/0115059 A1 | 6/2006 | Nobe |
| 2007/0285741 A1 | 12/2007 | Sato et al. |
| 2008/0055660 A1 | 3/2008 | Tsuzuki |

\* cited by examiner

IMAGE FORMING APPARATUS

CROSS-REFERENCE TO RELATED APPLICATIONS

This application is a continuation of co-pending U.S. patent application Ser. No. 13/333,163, filed Dec. 21, 2011, which is a continuation of U.S. patent application Ser. No. 12/411,635, filed Mar. 26, 2009, now U.S. Pat. No. 8,085,432, which is a continuation of U.S. patent application Ser. No. 11/071,807, filed Mar. 4, 2005, now U.S. Pat. No. 7,538,906, which is based upon and claims the benefit of priority from prior Japanese Patent Application No. 2004-063213, filed Mar. 5, 2004, the entire contents of which are incorporated herein by reference.

BACKGROUND OF THE INVENTION

1. Field of the Invention

The present invention relates to an image forming apparatus.

2. Description of the Related Art

JP-A-8-186678 discloses an image forming apparatus that can be used as a scanner, a printer, a copier, etc., in a state of being connected to a personal computer or the like. This image forming apparatus is equipped with a printer for printing and a scanner for reading of an image.

Both of the printer and the scanner should be wide and long enough to deal with a printing sheet or original document sheet of about the A4 size and hence occupy large spaces. Therefore, a measure is taken to minimize the area occupied by the entire apparatus; more specifically, a two-stage structure is employed in which the printer is disposed below and the scanner is disposed above the printer.

SUMMARY OF THE INVENTION

However, in the above image forming apparatus, an operating panel, ink cartridges, etc., are housed in a casing that projects sideways from the printer and the scanner. This results in problems that the apparatus cannot be packed easily at the time of shipment and the design performance of the entire apparatus is low.

In particular, the ink cartridges are components that restrict the layout most and hence are problematic because, for example, they should be disposed in such a place as to be attached and removed by an easy operation and they require a relatively tall arranging space because they need to be replaced.

The present invention provides an image forming apparatus in which ink cartridges and related components can be manipulated easily and the design performance of the entire apparatus, the ease of packing, etc., are not lowered.

According to an aspect of the invention, there is provided an image forming apparatus including: a reading mechanism having an original placement portion on which an original document is placed for reading an image of the original document; a recording mechanism having a medium supply tray on which a recording medium is set, the recording mechanism being disposed in such a manner that a longitudinal direction of the medium supply tray is substantially perpendicular to a longitudinal direction of the original placement portion; an angular casing that houses the reading mechanism and the recording mechanism while stacking the reading mechanism on the recording mechanism; and a cartridge holder that houses an ink cartridge and is disposed in a space located at a corner position of the casing below the reading mechanism and surrounded by a circumferential wall of the casing and a side wall of the medium supply tray.

In the image forming apparatus, the reading mechanism and the recording mechanism are arranged so as to cross each other. With this arrangement, since the width direction of the medium supply tray is shorter than the longitudinal direction of the reading mechanism, spaces that relatively ample in the vertical direction are defined between the circumferential wall of the casing and the side walls of the medium supply tray. Therefore, an ink cartridge(s), which requires a disposition space that is long in the vertical direction, can be accommodated without causing the casing to have a projected portion by disposing the cartridge holder utilizing the above-mentioned spaces. Further, since the ink cartridge(s) is disposed close to the corner of the casing, that is, at a place that is close to the circumference of the casing and a user can easily access with his or her hand, and a cartridge replacement operation can be performed easily.

BRIEF DESCRIPTION OF THE DRAWINGS

The present invention may be more readily described with reference to the accompanying drawings.

DETAILED DESCRIPTION OF THE PREFERRED EMBODIMENTS

An image forming apparatus 1 according to an embodiment of the present invention will be hereinafter described in detail with reference to FIGS. 1-10.

Figure 1:
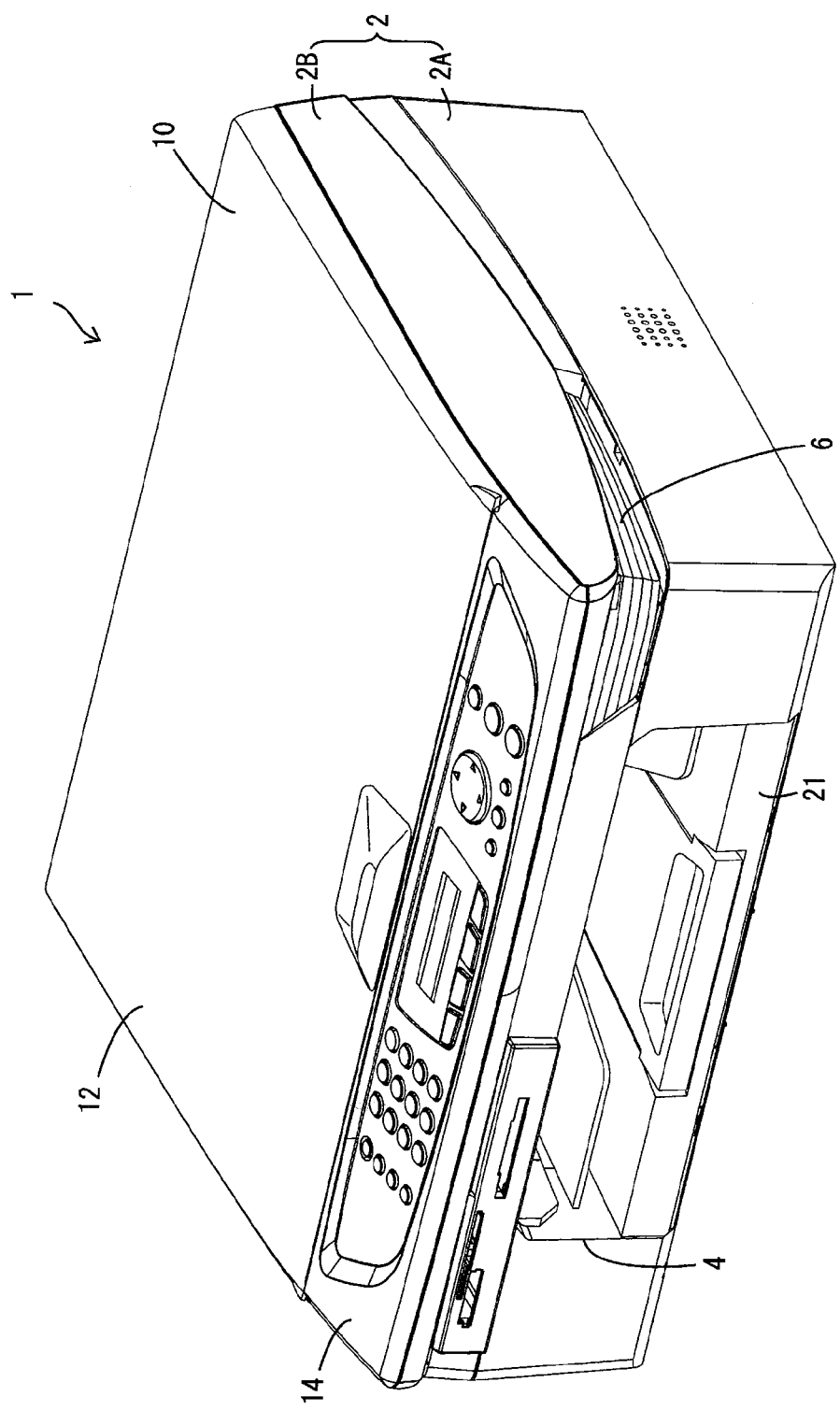
FIG. 1 is a perspective view of an image forming apparatus according to an embodiment.
Figure 2:
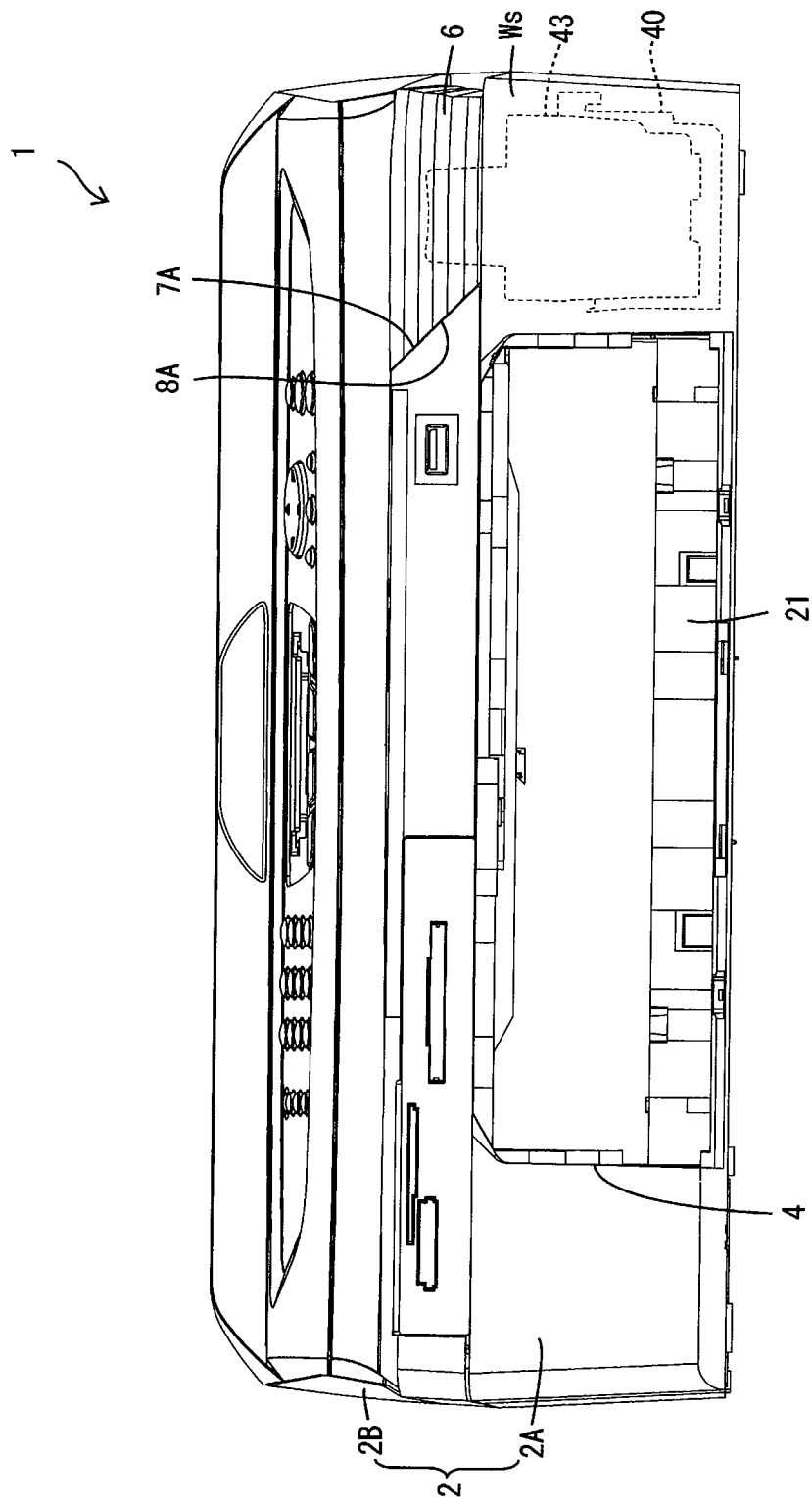
FIG. 2 is a front view of the image forming apparatus.

FIG. 1 shows the image forming apparatus 1 according to the embodiment. This image forming apparatus 1 is a multi-function machine having a facsimile function, a printer function, a scanner function, etc. The apparatus 1 is provided with, in a main body casing 2 that functions as a casing, an image reading section 10 that functions as a reading mechanism for reading an image and a recording section 20 that functions as a recording mechanism for performing recording on a sheet.

The casing 2 has, as a whole, a box shape that is a square when viewed from above, the square having a side that is one size larger than a longitudinal dimension of the A4-size sheet. The casing 2 is divided into two stages, that is, an angular lower cover 2A and an upper cover 2B that is attached to and covers the top surface of the lower cover 2A. The upper cover 2B houses the image reading section 10 and the lower cover 2A houses the recording section 20, whereby the image reading section 10 and the recording section 20 are in a stacked state.

The image reading section 10, which is accommodated in a top portion of the upper cover 2B, is equipped with a contact glass 11 that functions as an original placement portion and is fitted in a top surface portion of the image reading section 10 and an image sensor 100 that is disposed under the contact glass 11 and serves to read an image. In most cases, the image sensor 100 is a unit that employs a CIS (contact image sensor) or a CCD and has a reducing optical system. The contact glass 11 has such a size as to be able to support a maximum of an A4-size original document sheet.

The image reading section 10 is disposed close to the rear end of the upper cover 2B and is oriented in such a manner that the longitudinal direction of the contact glass 11 is parallel with the width direction of the apparatus 1. A lid plate 12 for pressing an original document sheet while covering the entire surface of the contact glass 11 is disposed on the top surface side of the upper cover 2B so as to be able to open and close the image reading section 10. More specifically, the lid plate 12 is connected to the upper cover 2B via a lid hinge 13 that is attached to the top portion of the rear end wall of the upper cover 2B, whereby the lid plate 12 can rotate in the front-rear direction about the top portion of the rear end wall of the upper cover 2B.

The operating panel 14 is disposed in front of the image reading section 10. The operating panel 14 has such an oblong shape as to just occupy the space between the front end wall of the image reading section 10 and that of the casing 2. A liquid crystal screen, buttons to be manipulated for, for example, turning on/off of power, switching among various functions, and setting of image reading or recording conditions, and other things are arranged on the top surface of the operating panel 14.

Incidentally, a side on which the operating panel 14 is disposed in FIG. 1 is referred to as a front side in this embodiment. A direction extending from the front side to an opposite side (rear side) is referred to as a depth direction.

The upper cover 2B is attached to the lower cover 2A so as to be opened and closed with respect to the lower cover 2A. More specifically, the upper cover 2B is connected to the lower cover 2A via cover hinges 5 (see FIG. 9) of the upper cover that are attached to the top portion of one (the left-hand one as viewed from the front side) of the side walls of the lower cover 2A. This allows the upper cover 2B to rotate in the right-left direction about the top portion of the sidewall. Since the cover hinges 5 are attached to the side wall of the casing 2 in this manner, the upper cover 2B is opened sideways, that is, on its right-end side (or left-end side), when viewed from a user who manipulates the apparatus 1 standing in front of it. For example, if the user opens the upper cover 2B with an original document sheet set on the image reading section 10, the original document sheet may fall from the upper cover 3B. In many cases, the apparatus 1 is installed in such a manner that its rear surface is as close to the wall of a room as possible and hence a thing that has fallen to the back side is hard to pick up. However, since the upper cover 2B is opened sideways, even if an original document sheet falls, it falls to the right or left of the apparatus 1, which prevents an event that it falls to the back side.

Figure 4:
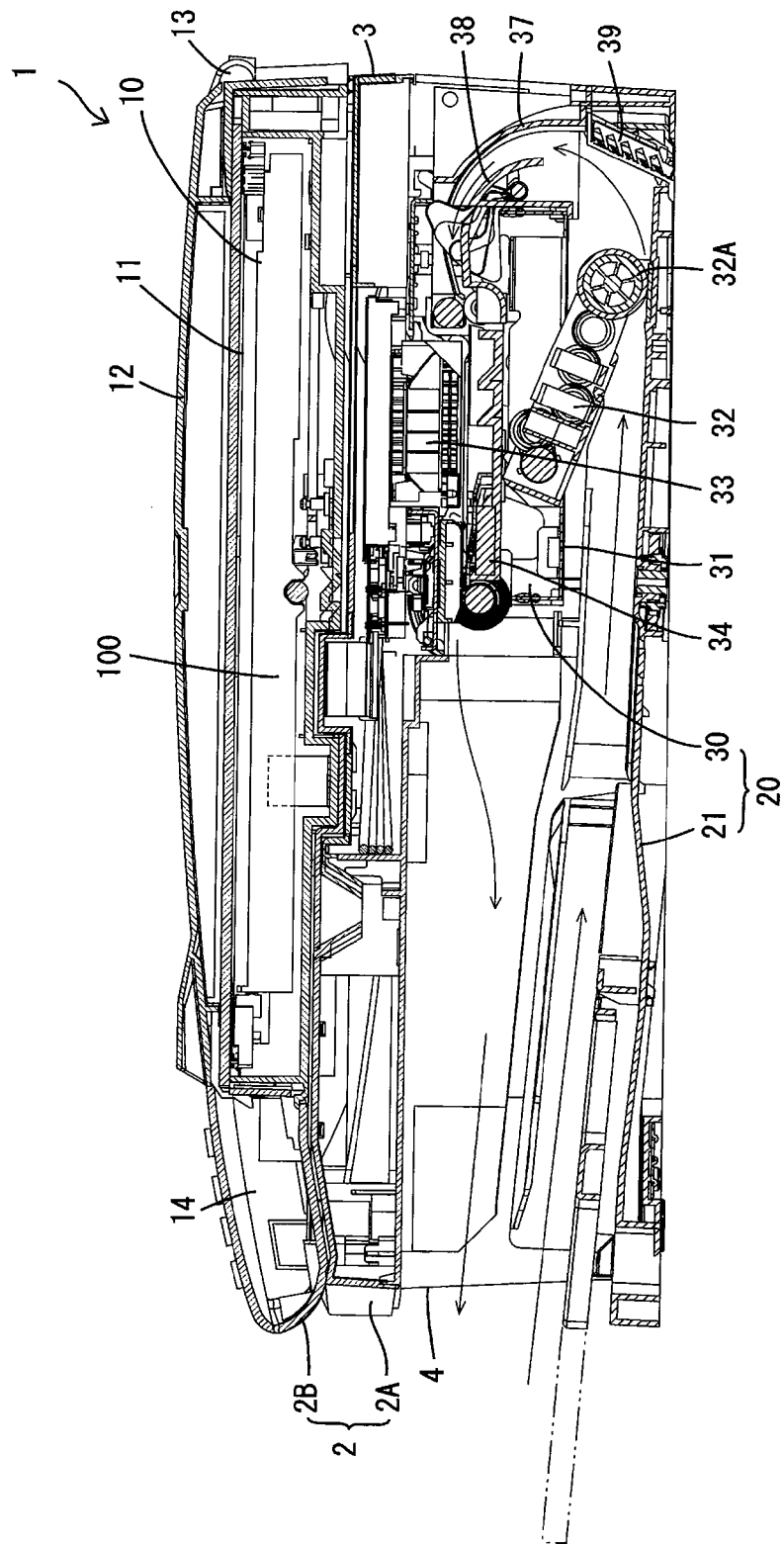
FIG. 4 is a side sectional view of the image forming apparatus.
Figure 5:
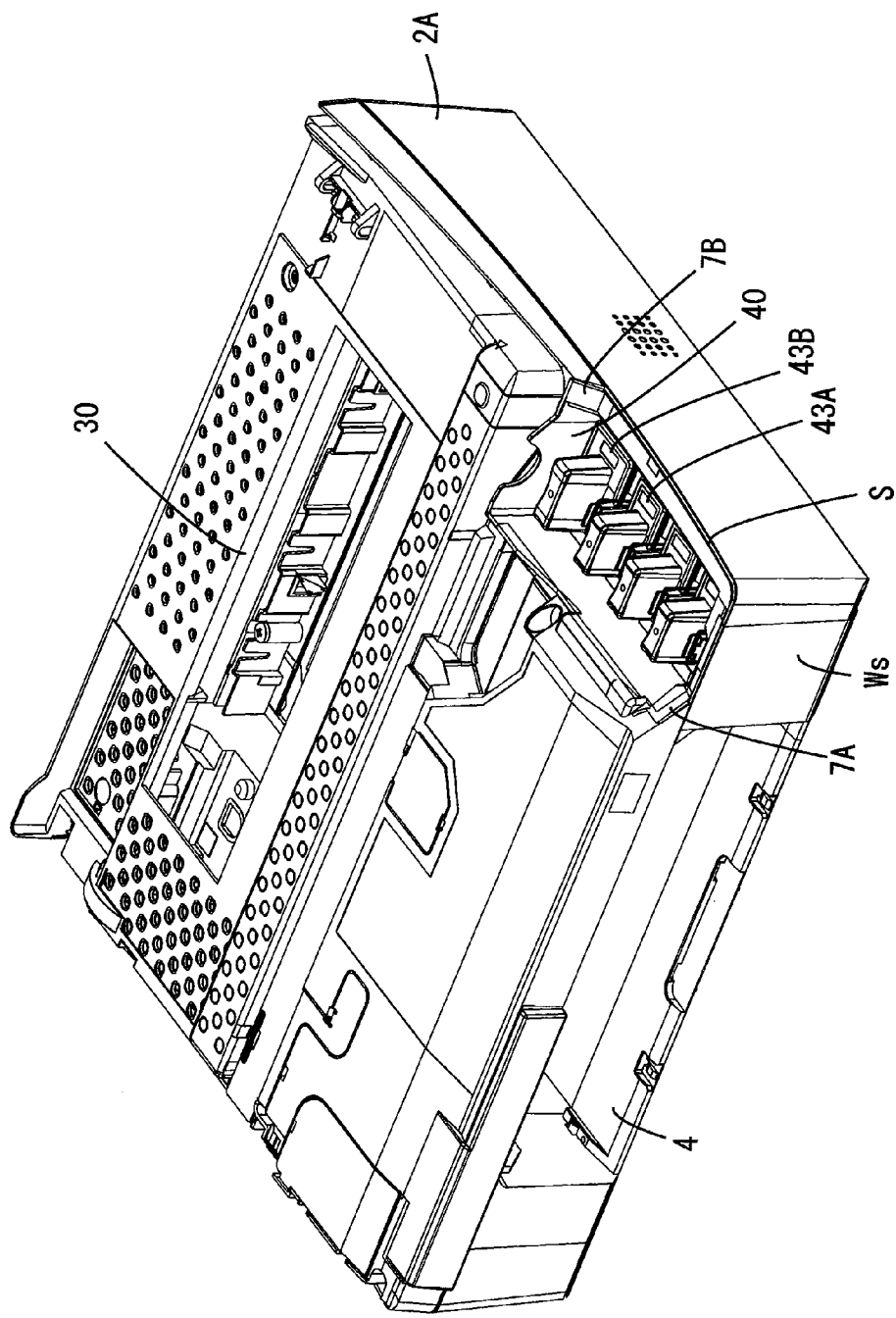
FIG. 5 is a perspective view of a part of a lower cover that houses a recording unit and a cartridge holder.
Figure 6:
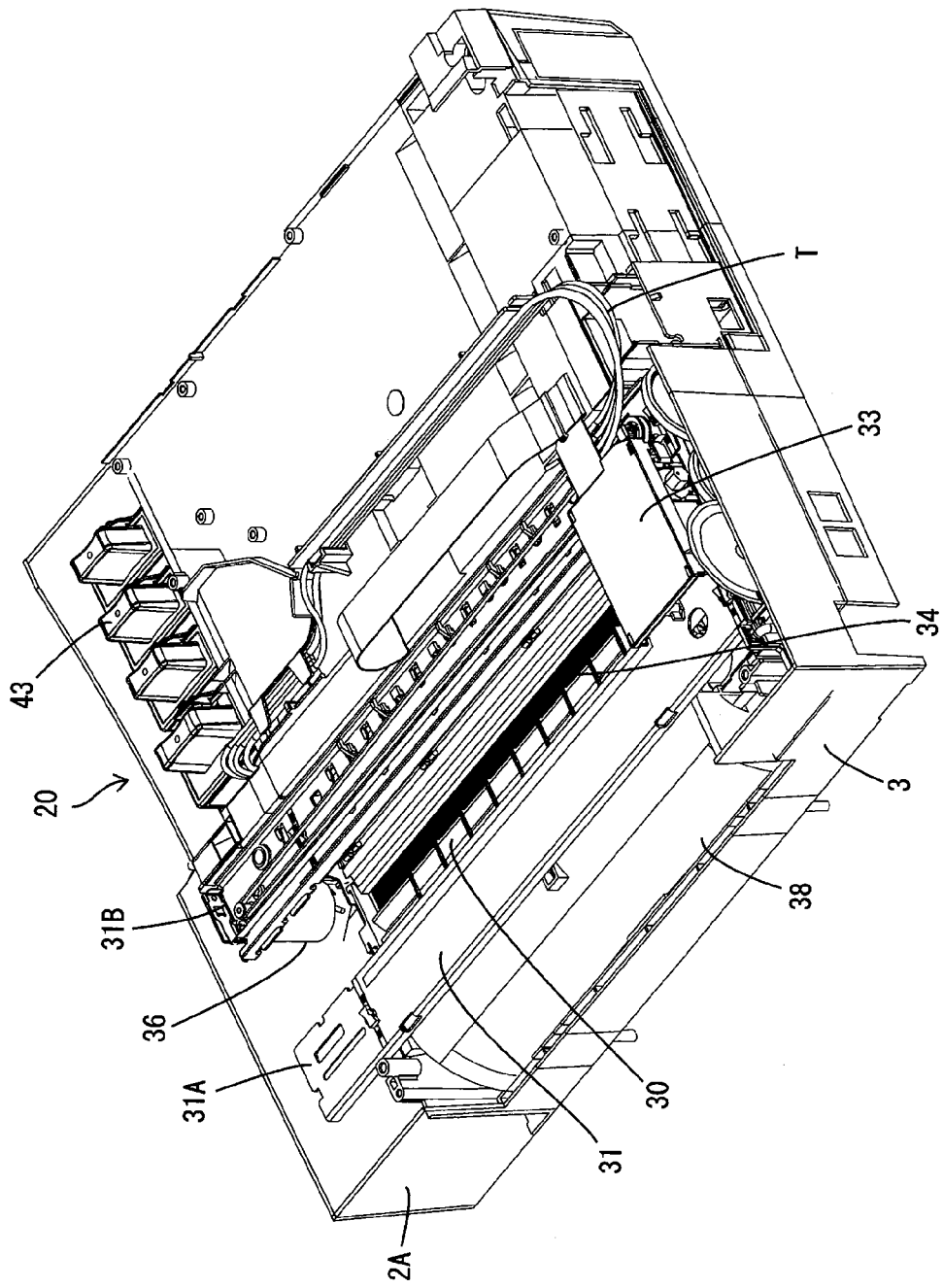
FIG. 6 is another perspective view of a part of the lower cover that houses the recording unit and the cartridge holder.

On the other hand, the recording section 20, which is accommodated in the lower cover 2A, is equipped with a sheet feed cassette 21 that functions as a medium supply tray in which sheets are set and an ink jet recording unit 30 that is disposed above the sheet feed cassette 21 (see FIGS. 4-6).

The sheet feed cassette 21 is formed into a rectangular, shallow dish shape having approximately the A4 size. A plate attachment portion 4 is provided in a bottom portion, located at its center in the width direction, of the lower cover 2A so as to have a front opening and reach to a rear wall 3 of the lower cover 2A. The sheet feed cassette 21 is inserted, in a detachable manner, in a bottom portion of the plate attachment portion 4 in such a manner that its longitudinal direction is kept parallel with the depth direction of the casing 2. A guide plate 39 for guiding upward a sheet that is sent from the sheet feed cassette 21 and a pair of arc-shaped guides 37 and 38 that are continuous with and extend upward from the guide plate 39 and serve to U-turn the sheet forward are disposed above the rear end of the sheet feed cassette 21.

The recording unit 30 for performing printing on a sheet is disposed above the rear portion of the plate attachment portion 4 in front of the two arc-shaped guides 37 and 38. A frame 31 generally has a box-shape that is somewhat longer in the right-left direction than the width of the sheet feed cassette 21. Two guide plates 31A and 31B extending in the right-left direction are arranged parallel with each other in the front-rear direction are disposed above the frame 31. A carriage 33 having a recording head is mounted on the guide plates 31A and 31B so as to bridge them. A platen member 34 for supporting a sheet from below, a sheet feed roller, etc., (not shown in detail) are provided inside the frame 31 below the two guide plates 31A and 31B. A motor 36 for driving the carriage 33 is disposed on one side of the frame 31. Although not shown in the drawings in detail, a driving section for driving the sheet feed roller, etc., a waste ink cartridge, a maintenance unit for maintenance of the recording head, a standby space where the carriage 33 stands by while recording is not performed, and other things are provided on the other side of the frame 31 at positions outside the width of a sheet that passes by the frame 31. Further, a sheet feed arm 32 having a sheet feed roller 32A for moving sheets in the sheet feed cassette 21 rearward is disposed under the frame 31.

A sheet that has been U-turned being guided by the arc-shaped guides 37 and 38 is sent onto the platen member 34 and moved forward by the sheet feed roller by a prescribed length each time. At the same time, the carriage 33 is reciprocated in the width direction and ink droplets are jetted out of the recording head on the basis of prescribed data. As a result, an image is recorded on the sheet. The recorded sheet is ejected forward.

Incidentally, in the image forming apparatus 1 according to the embodiment, a cartridge holder 40 is provided separately from the carriage 33 and disposed in the casing 2. The cartridge holder 40 is disposed in the lower cover 2B. More specifically, the cartridge holder 40 is disposed on the front side of the recording unit 30 beside the sheet feed cassette 21, that is, in a front corner portion. In the image forming apparatus 1, the image reading section 10 and the sheet feed cassette 21 of the recording section 20 are arranged so as to cross each other. Since the width dimension of the sheet feed cassette 21 is shorter than the longitudinal dimension of the image reading section 10, spaces relatively ample in the vertical direction are formed between the circumferential wall of the casing and the side walls of the sheet feed cassette 21. Therefore, ink cartridges 43, which require a disposition space that is long in the vertical direction, can be accommodated without causing the casing 2 to have a projected portion by disposing the cartridge holder 40 and the ink cartridges 43 utilizing the above-mentioned spaces.

The cartridge holder 40 is disposed in one of the two front corner portions of the lower cover 2A that is located on the side opposite to the side where the cover hinges 5 are provided.

Figure 7:
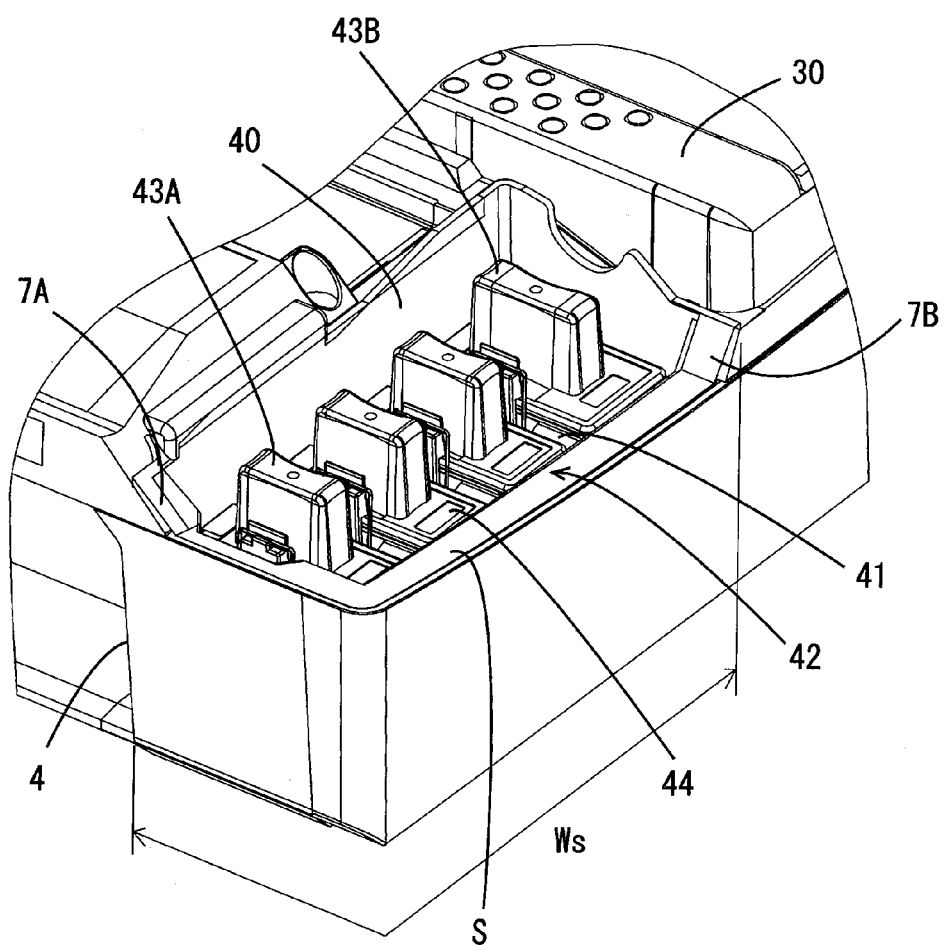
FIG. 7 is an enlarged view of a part of the lower cover.
Figure 8:
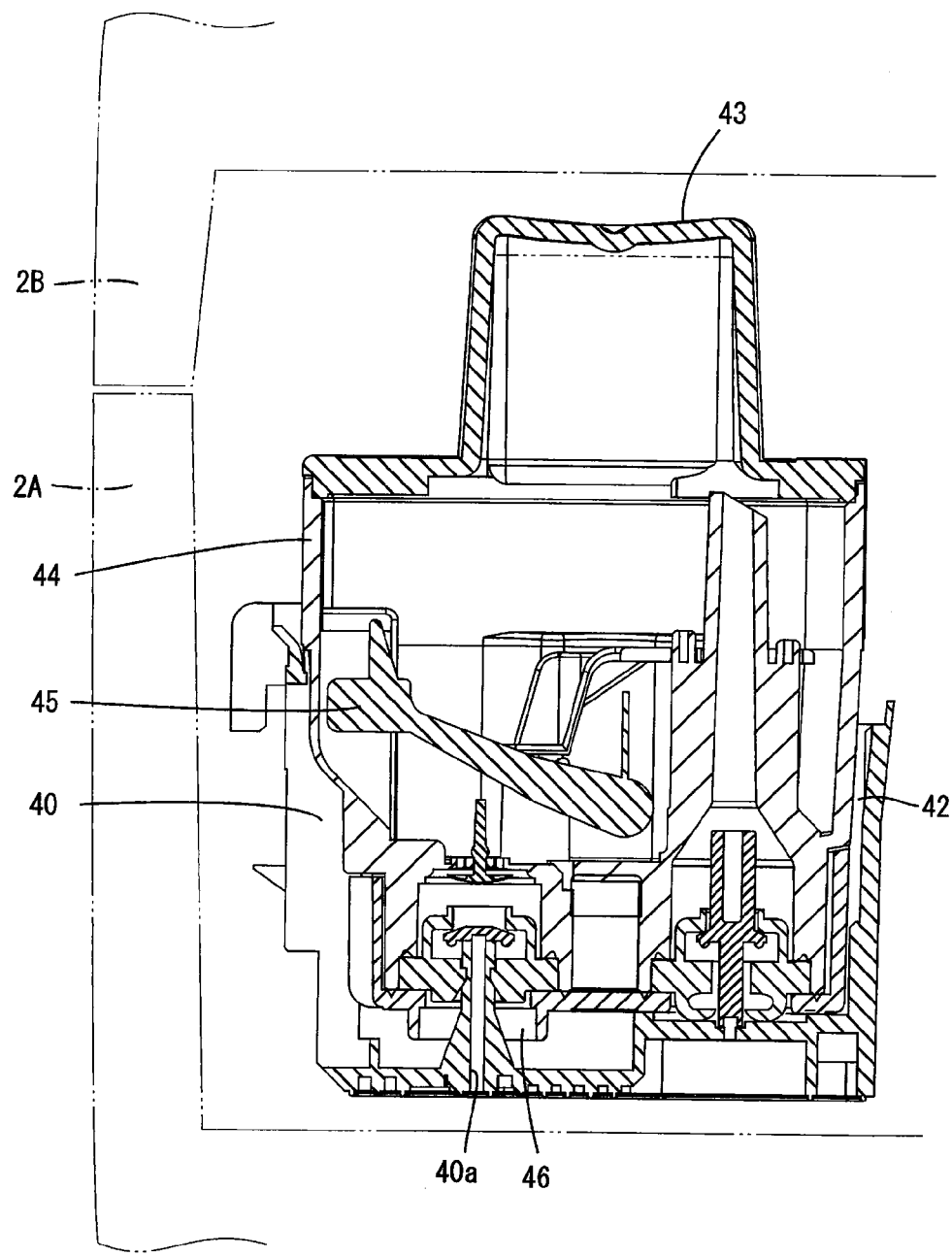
FIG. 8 is an enlarged sectional view of a part of the cartridge holder.

The cartridge holder 40 has a box shape that has an open top and is long in the depth direction of the casing 2 (see FIGS. 5 and 7). The inside of the cartridge holder 40 is divided by partitions 41 into four cartridge rooms 42 that are arranged parallel in the depth direction. Among the four cartridge rooms 42, the three front ones have the same width and the rear one is somewhat wider.

The ink cartridges 43 that are filled with inks are placed in the cartridge rooms 42, respectively, as a result of insertion from above. Each ink cartridge 43 has a box-shaped ink room 44 the inside of which is filled with an ink. Ink cartridges 43A of three colors (C: cyan, M: magenta, and Y: yellow) are placed in the three front ones, respectively, among the four cartridge rooms 42, and a black ink cartridge 43B that is somewhat wider than the ink cartridges 43A of the three colors is placed in the rearmost cartridge room 42.

A float 45 that is supported by a hinge at one end and is inclined in accordance with the residual amount of the ink is provided inside each ink room 44. The ink residual amount can be detected on the basis of a variation of the tip position of the float 45. An ink supply outlet 46 that communicates with the ink room 44 is provided under the ink room 44. The ink supply outlet 46 is connected to an associated liquid sending tube T via an associated ink flow passage 40a that is formed in the cartridge holder 40. The liquid sending tubes T run above the plate attachment portion 4 and is connected to the carriage 33. Inks are supplied to the recording head through the respective liquid sending tubes T.

An L-shaped portion, surrounding the cartridge holder 40 partially, of the front wall and one side wall of the lower cover 2A is a low-height portion Ws that is lower in height than the other portions. The top surface of the low-height portion Ws is so low as to be close to the top surfaces of the ink rooms 44 of the ink cartridges 43, which makes it easier to access an ink cartridge 43 with a hand in replacing it.

Figure 3:
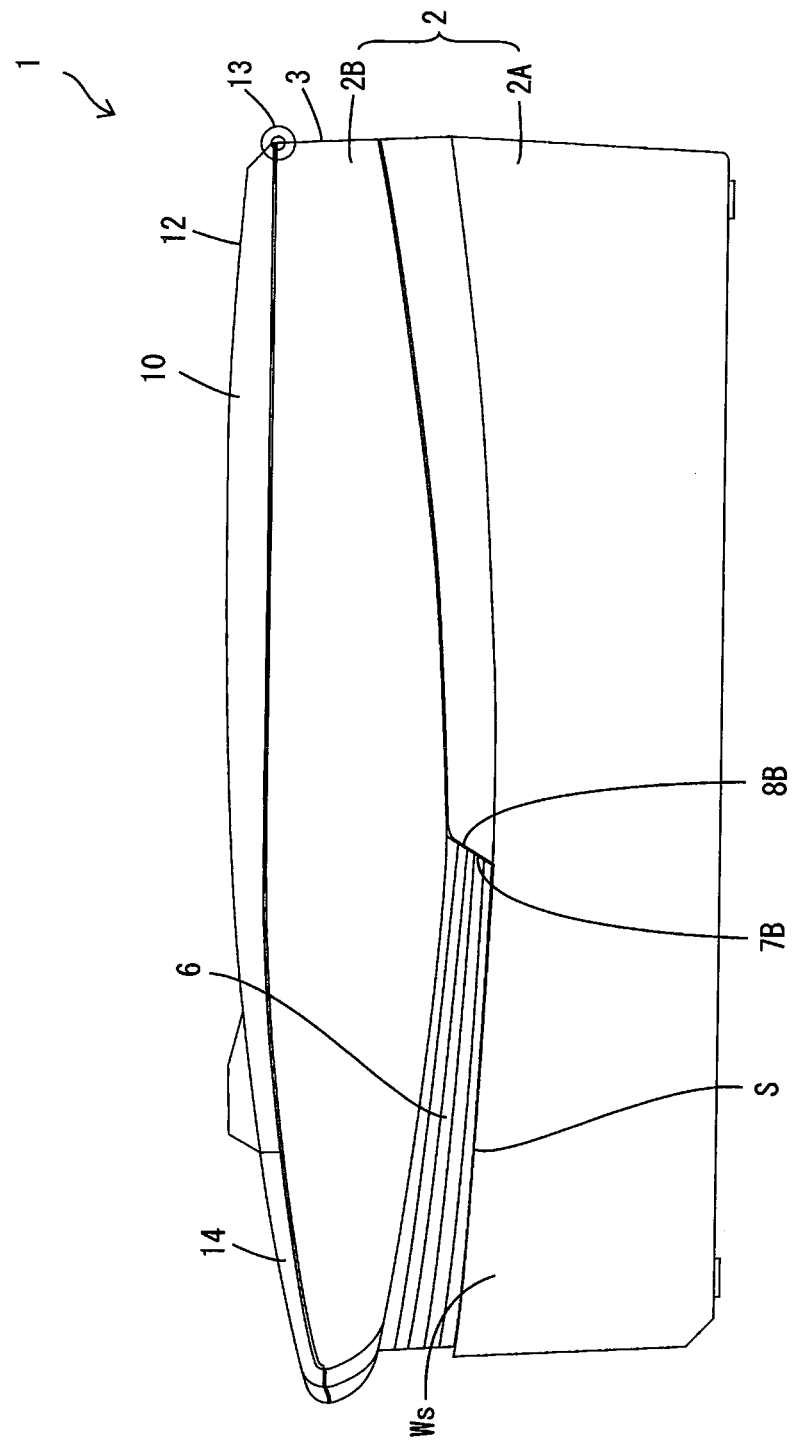
FIG. 3 is a side view of the image forming apparatus.

A part of the low-height portion Ws that constitutes a part of the one side wall of the lower cover 2A has a slant top surface S that goes down rearward (see FIGS. 3 and 5). Step portions of the top surface of the lower cover 2A between the low-height portion Ws and the other portions of the lower cover 2A are bottom-cover-side slant surfaces 7A and 7B that go down in the respective directions from the other portions to the low-height portion Ws.

Figure 9:
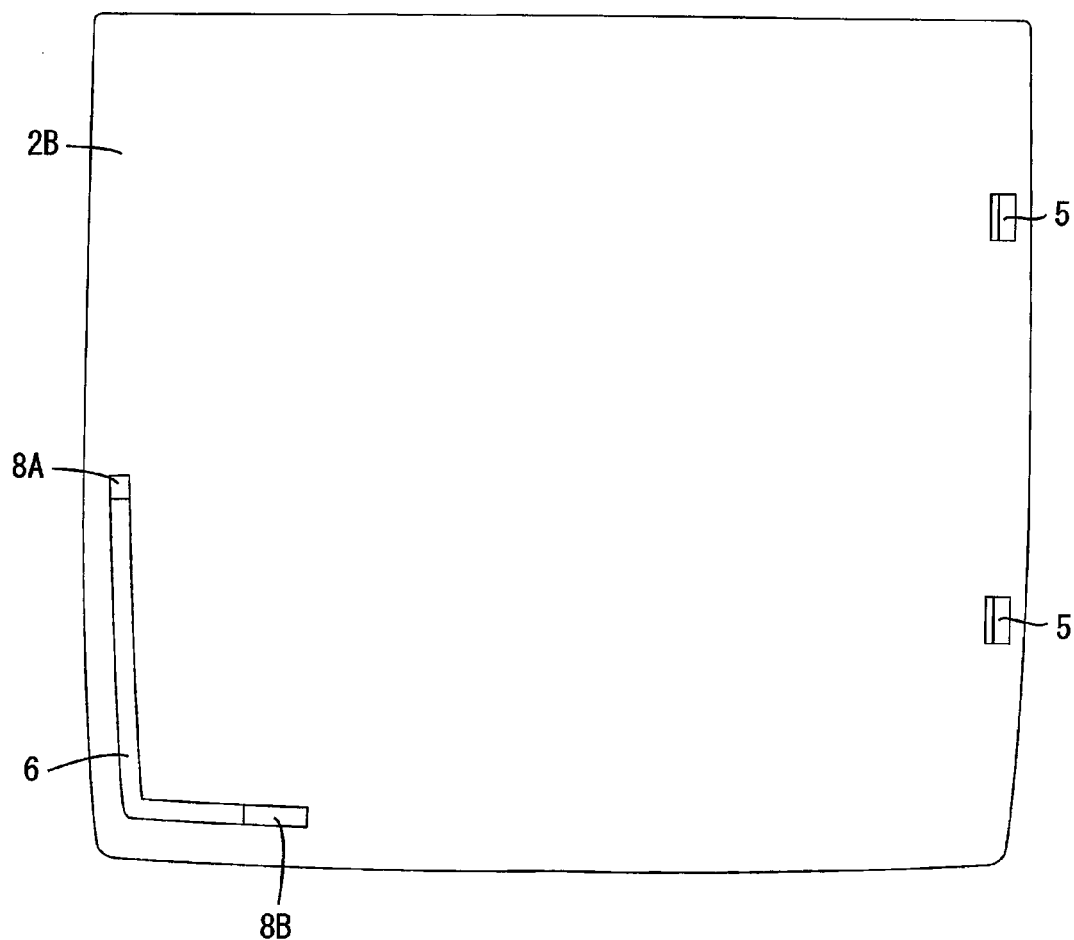
FIG. 9 is a bottom view of an upper cover.

The bottom surface of the upper cover 2B is formed with, at a position corresponding to the low-height portion Ws, an L-shaped projection wall 6 that projects downward to reach the top surface of the low-height portion Ws (see FIGS. 1 and 9). As a result, in a state that the upper cover 2B is closed, the projection wall 6 prevents formation of a space between the bottom surface of the upper cover 2B and the top surface of the low-height portion Ws and thereby prevents dust or the like from entering the inside. The projection wall 6 has, at the respective ends of the L shape, top-cover-side slant surfaces 8A and 8B that are to touch the respective bottom-cover-side slant surfaces 7A and 7B of the lower cover 2A. By virtue of the structure that the low-height portion Ws and the projection wall 6 have the slant surfaces 7 and 8 that are to touch each other, even if the cover hinges 5 become loose to cause some play, the upper cover 2B can be positioned correctly with respect to the lower cover 2A (see FIGS. 2 and 3).

Figure 10:
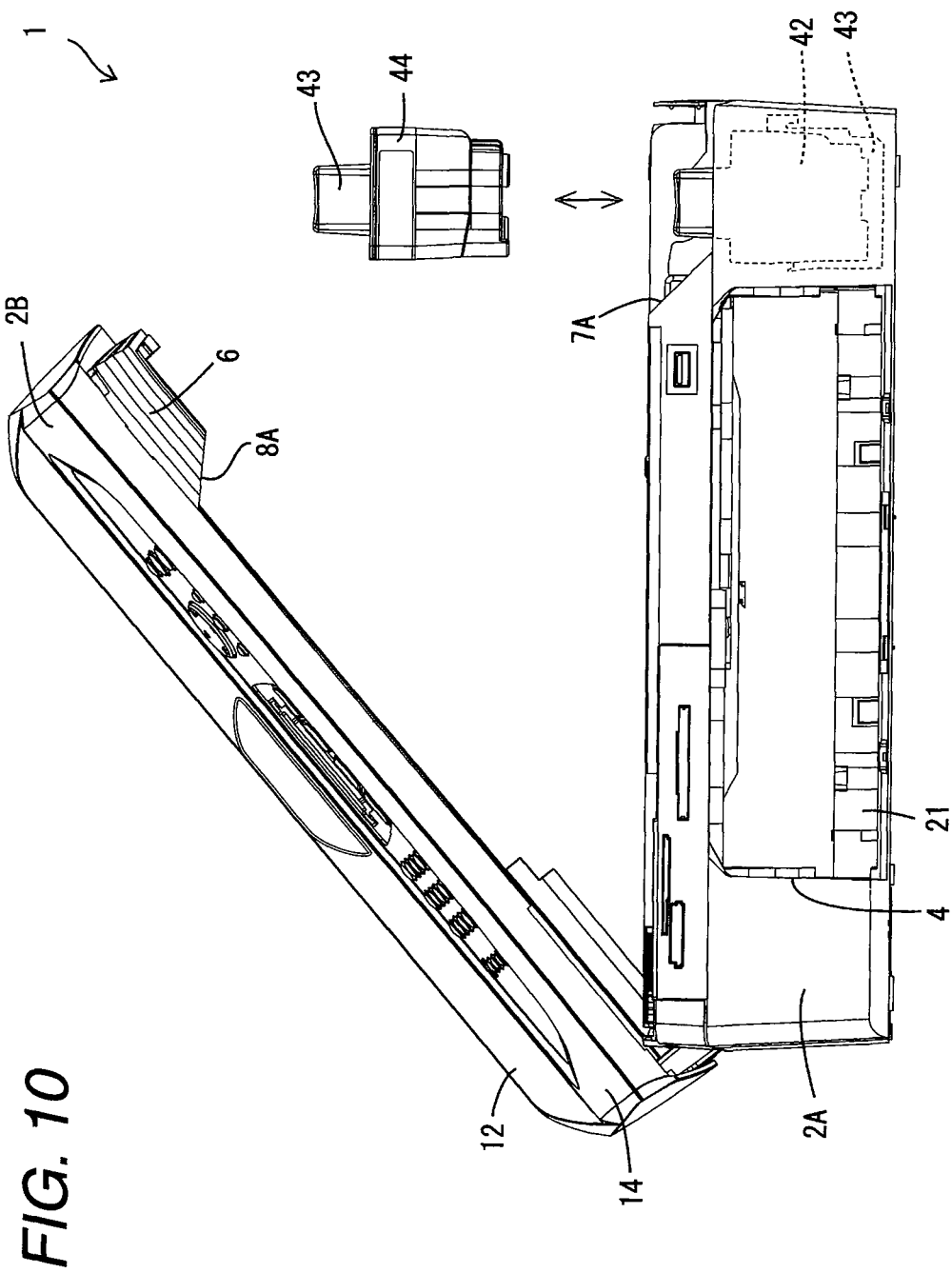
FIG. 10 is a front view showing how an ink cartridge is replaced by opening the upper cover.

To replace a spent ink cartridge 43, first, the upper cover 2B is opened to make the lower cover accessible from above (see FIG. 10). The lid plate 12 of the image reading section 10 exists at the top of the upper cover 2B. However, the lid hinge 13 for the attachment of the lid plate 12 and the cover hinges 5 for the attachment of the upper cover 2B are provided on the circumferential wall sides of the casing 2 that cross each other (the lid hinge 13 is on the rear side and the cover hinges 5 are on the left side). Therefore, the lid plate 12 is rotated in the direction (front-rear direction) that is different from the rotation direction (right-left direction) of the upper cover 2B, which prevents an event that the lid portion 12 is caused to open by an operation of opening or closing the upper cover 2B.

In a state that the upper cover 2B is opened, a spent ink cartridge 43 is removed and replaced with a new one. At this time, the ink cartridge 43 can easily be accessed with a hand because in the lower cover 2A the cartridge holder 40 is partially surrounded by the low-height portion Ws. The cartridge holder 40 is located in the front portion of the lower cover 2A, which can easily be accessed with a hand, on the side that is opposite to the side on which the cover hinges 5 for the connection to the upper cover 2B is located, that is, on the side where a large space is formed between the bottom surface of the upper cover 2B and the top surface of the lower cover 2A when the upper cover 2B is opened. This facilitates an operation of replacing an ink cartridge 43. In addition, the part of the low-height portion Ws that constitutes the one side wall of the lower cover 2A has the slant top surface S that goes down rearward. With this structure, the interval between the bottom surface of the upper cover 2B and the top surface of the lower cover 2A increases as the position comes closer to the rear end (the front side is the side where a user is to stand), that is, as it becomes more difficult for the user to access an ink cartridge 43 with his or her hand. This facilitates a replacement operation.

Further, the upper cover 2B is attached to the lower cover 2A in a non-locked state. If the upper cover 2B were attached to the lower cover 2A in a locked state, there might occur an event that a user lifts the apparatus 1 by holding only the upper cover 2B with his or her hands to, for example, move the apparatus 1 and then the lower cover 2A is unlocked because of its own weight and fall, resulting in, for example, damage of the lower cover 2B. In contrast, where the upper cover 2B is attached to the lower cover 2A in a non-locked state, the lower cover 2B is not lifted if the user holds only the upper cover 2B with his or her hands and hence the above kind of event can be avoided.

As described above, in the image forming apparatus 1 according to this embodiment, a portion around the cartridge holder 40 of the circumferential wall of the casing is a low-height portion Ws that is lower in height than the other portions of the circumferential wall.

With this structure, since the circumferential wall of the casing 2 has the low-height portion Ws, a user can easily access a cartridge in replacing it and hence the replacement operation is facilitated.

Also, a part of the low-height portion Ws that constitutes a side wall of the casing 2 has a slant top surface S that extends in a depth direction and is inclined downward.

Therefore, a large opening can be formed in a deeper portion that is hard to access with a hand in replacing a cartridge, whereby the replacement operation is facilitated.

Further, the casing 2 includes: a lower cover 2A that houses the recording mechanism, the lower cover being provided with the cartridge holder 40 and the low-height portion Ws; and an upper cover 2B that houses the reading mechanism and covers the lower cover 2A from above, the upper cover 2B having a projection wall 6 that projects downward from a bottom surface of the upper cover 2B at a position corresponding to the low-height portion Ws to reach to the top surface of the low-height portion.

With this structure, the projection wall 6 prevents formation of a space between the top surface of the low-height portion Ws and the upper cover 2B, which prevents dust or the like from entering the inside.

In addition, a cove hinge 5 that fixes the upper cover 2B in such a manner that the upper cover 2B can be opened and closed is attached to a first side of the circumferential wall of the lower cover 2A; and the cartridge holder 40 is provided in a vicinity of a second side that is opposite to the first side of the circumferential wall.

The cartridge holder 40 is provided on the side that is opposite to the side on which the cover hinge 5 is provided, that is, it is provided on the side where a large interval can be formed when the upper cover 2B is opened. This makes it possible to provide a large space in which to insert a hand, and thereby facilitates a cartridge replacement operation.

The image forming apparatus further includes a lid 12 that covers the original placement portion, the lid 12 being attached to the upper cover 2B in such a manner that the lid can be opened and closed via a lid hinge 13 that is provided on one side of the circumferential wall that crosses the first side of the circumferential wall.

The cover hinge 5 and the lid hinge 13 are provided on the circumferential wall sides of the casing 2 that cross each other. That is, the upper cover 2B and the lid 12 are rotated in the directions that cross each other. This structure prevents the lid 12 from opening or flapping contrary to the intent in opening or closing the upper cover 2B for maintenance of the ink cartridge(s).

Furthermore, the cover hinge 5 is attached to a side wall of the casing 2.

Therefore, the upper cover 2B is opened sideways, that is, on its right or left-end side, when viewed from a user who manipulates the apparatus standing in front of it.

If a user opens the upper cover 2B in a state that an original document that is about to be read or has just been read is placed on the original placement portion of the reading mechanism or the lid 12, the original document may fall from the upper cover. However, since the upper cover 2B is opened sideways, even if the original document falls, it falls to the right or left of the apparatus, which prevents an event that it falls to the back side where it is difficult to access with a hand.

Additionally, the upper cover 2B is attached to the lower cover 2A in a non-locked state.

If the upper cover 2B were attached to the lower cover 2A in a locked state, there might occur an event that a user lifts the apparatus 1 by holding only the upper cover 2B with his or her hands to, for example, move the apparatus 1 and then the lower cover 2A is unlocked because of its own weight and fall, resulting in, for example, damage of the lower cover 2A. In contrast, where the upper cover 2B is attached to the lower cover 2A in a non-locked state, the lower cover 2A is not lifted if the user holds only the upper cover with his or her hands and hence the above kind of event can be avoided.

Moreover, in the image forming apparatus 1, step portions of the top surface of the lower cover 2A between the low-height portion Ws and the other portions are bottom-cover-side slant surfaces that go down in respective directions from the other portions to the low-height portion, and a bottom surface of the projection wall 6 is formed with, at positions corresponding to the bottom-cover-side slant surfaces, top-cover-side slant surfaces that touch the respective bottom-cover-side slant surfaces.

The low-height portion and the projection wall are formed with the slant surfaces that touch each other. With this structure, even if the hinge that connects the upper cover 2B and the lower cover 2A has some play, the upper cover 2B can be positioned correctly with respect to the lower cover 2A by sliding the two sets of slant surfaces on each other into registration. The upper cover 2B can thus be made stable.

The technical scope of the invention is not limited to the above-described embodiment. For example, the technical scope of the invention encompasses the following configurations as well as equivalents. (1) In the above embodiment, the image reading section 10 is disposed with such orientation that the longitudinal direction of the contact glass 11 is parallel with the width direction of the apparatus 1 and the recording section 20 is disposed with such orientation that the longitudinal direction of the sheet feed cassette 21 is parallel with the depth direction of the apparatus 1. However, it is also possible to orient the image reading section 10 in such a manner that the longitudinal direction of the contact glass 11 is parallel with the depth direction of the apparatus 1 and to orient the recording section 20 in such a manner that the longitudinal direction of the sheet feed cassette 21 is parallel with the width direction of the apparatus 1. (2) Although in the above embodiment the lid hinge 13 is provided on the rear circumferential wall sideline of the casing 2 and the cover hinges 5 are provided on the left circumferential wall sideline, it is possible to provide the lid hinge 13 on the right or left sideline and to provide the cover hinges 5 on the rear sideline.

What is claimed is:

1. An image forming apparatus comprising:
    a main unit including:
        a recording unit which includes a recording head configured to record an image on a recording medium;
        an ink tube connected to the recording head; and
        a cartridge holder disposed at a corner of the main unit and configured to receive an ink cartridge, the cartridge holder being opened in an upper direction; and
    a reading unit disposed above the recording unit, the reading unit being configured to pivot with respect to the main unit between an open position and a closed position, the reading unit including:
        an original placement portion configured to receive an original document thereon;
        an image sensor configured to read an image of the original document;
        a cover portion configured to cover a top surface of an upper portion of the ink cartridge when the ink cartridge is received by the cartridge holder and the reading unit is in the closed position, and configured to expose the top surface of the upper portion of the ink cartridge when the ink cartridge is received by the cartridge holder and the reading unit is in the open position; and
        a protruding portion protruding downward from the cover portion and configured to cover a side surface of the upper portion of the ink cartridge when the ink cartridge is received by the cartridge holder and the reading unit is in the closed position, and configured to expose the side surface of the upper portion of the ink cartridge when the ink cartridge is received by the cartridge holder and the reading unit is in the open position.

2. The image forming apparatus according to claim 1, wherein an end of the protruding portion is lower than the original placement portion.

3. The image forming apparatus according to claim 1, wherein the reading unit further includes an operation panel.

4. The image forming apparatus according to claim 1, wherein the ink cartridge received by the cartridge holder is detachable from the cartridge holder.

5. The image forming apparatus according to claim 1, further comprising a feeding mechanism configured to feed the recording medium in a feed direction parallel to an axis about which the reading unit is configured to pivot.

6. The image forming apparatus according to claim 1, wherein the protruding portion includes:

a first portion having a surface substantially parallel to an axis about which the reading unit is configured to pivot; and a second portion having a surface substantially perpendicular to the axis.

7. An image forming apparatus comprising:

a main unit including:

a recording unit which includes a recording head configured to record an image on a recording medium;

an ink tube connected to the recording head; and a cartridge holder disposed at a corner of the main unit and configured to receive an ink cartridge; and a reading unit disposed above the recording unit, the reading unit being configured to pivot with respect to the main unit between an open position and a closed position, the reading unit including:

an original placement portion configured to receive an original document thereon;

an image sensor configured to read an image of the original document;

a cover portion configured to cover a top surface of an upper portion of the ink cartridge when the ink cartridge is received by the cartridge holder and the reading unit is in the closed position, and configured to expose the top surface of the upper portion of the ink cartridge when the ink cartridge is received by the cartridge holder and the reading unit is in the open position; and a protruding portion protruding downward from the cover portion and configured to cover a side surface of the upper portion of the ink cartridge when the ink cartridge is received by the cartridge holder and the reading unit is in the closed position, and configured to expose the side surface of the upper portion of the ink cartridge when the ink cartridge is received by the cartridge holder and the reading unit is in the open position, wherein the corner where the cartridge holder is disposed is a farthest corner of the main unit from an axis about which the reading unit is configured to pivot.

8. The image forming apparatus according to claim 7, wherein the cartridge holder is opened in upper direction.

9. The image forming apparatus according to claim 7, wherein the protruding portion includes:

a first portion having a surface substantially parallel to the axis; and a second portion having a surface substantially perpendicular to the axis.

10. The image forming apparatus according to claim 7, further comprising a feeding mechanism configured to feed the recording medium in a feed direction parallel to the axis.

11. The image forming apparatus according to claim 7, wherein an end of the protruding portion is lower than the original placement portion.

12. The image forming apparatus according to claim 7, wherein the reading unit further includes an operation panel.

13. An image forming apparatus comprising:

a main unit including:

a recording unit which includes a recording head configured to record an image on a recording medium;

a plurality of ink tubes connected to the recording head; and a cartridge holder disposed at a corner of the main unit and configured to receive a plurality of ink cartridges, the cartridge holder being opened in an upper direction; and a reading unit disposed above the recording unit, the reading unit being configured to pivot with respect to the main unit between an open position and a closed position, the reading unit including:

an original placement portion configured to receive an original document thereon;

a reading device configured to read an image of the original document;

a cover portion configured to cover top surfaces of upper portions of the plurality of ink cartridges when the plurality of ink cartridges are received by the cartridge holder and the reading unit is in the closed position, and configured to expose the top surfaces of the upper portions of the plurality of ink cartridges when the plurality of ink cartridges are received by the cartridge holder and the reading unit is in the open position; and a protruding portion protruding downward from the cover portion and configured to cover a side surface of at least one of the upper portions of the plurality of ink cartridges when the plurality of ink cartridges are received by the cartridge holder and the reading unit is in the closed position, and configured to expose the side surface of the at least one of the upper portions of the plurality of ink cartridges when the plurality of ink cartridges are received by the cartridge holder and the reading unit is in the open position.

14. The image forming apparatus according to claim 13, wherein the corner where the cartridge holder is disposed is a farthest corner of the main unit from an axis about which the reading unit is configured to pivot.

15. The image forming apparatus according to claim 14, wherein the protruding portion includes:

a first portion having a surface substantially parallel to the axis; and a second portion having a surface substantially perpendicular to the axis.

16. The image forming apparatus according to claim 14, wherein the cartridge holder is configured to receive the plurality of ink cartridges such that the plurality of the ink cartridge are arranged in a direction parallel to the axis.

17. The image forming apparatus according to claim 13, further comprising a feeding mechanism configured to feed the recording medium in a feed direction parallel to an axis about which the reading unit is configured to pivot.

18. The image forming apparatus according to claim 13, wherein an end of the protruding portion is lower than the original placement portion.

19. The image forming apparatus according to claim 13, wherein the reading unit further includes an operation panel.

20. The image forming apparatus according to claim 13, wherein the ink cartridges received by the cartridge holder are detachable from the cartridge holder.

* * * * *